United States Patent [19]
Yli-Kyyny et al.

[11] Patent Number: 5,948,170
[45] Date of Patent: *Sep. 7, 1999

[54] SWEETENING AGENT, PROCESS FOR ITS PRODUCTION, AND ITS USE

[75] Inventors: Mauri Yli-Kyyny, Helsinki; Juha Oravainen, Jokioinen, both of Finland

[73] Assignee: Xyrofin Oy, Helsinki, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/525,582

[22] PCT Filed: Mar. 21, 1994

[86] PCT No.: PCT/FI94/00104

§ 371 Date: Nov. 13, 1995

§ 102(e) Date: Nov. 13, 1995

[87] PCT Pub. No.: WO94/21827

PCT Pub. Date: Sep. 29, 1994

[30] Foreign Application Priority Data

Mar. 19, 1993 [FI] Finland ................ 931232

[51] Int. Cl.$^6$ .......................... C13F 3/00; C08B 30/00; A23G 3/00; A23B 4/03
[52] U.S. Cl. .......................... 127/30; 127/39; 426/658; 426/659; 426/660; 426/443; 426/520
[58] Field of Search ........................ 127/30, 29; 426/658, 426/659, 660, 443, 520

[56] References Cited

U.S. PATENT DOCUMENTS

| | | | |
|---|---|---|---|
| 3,140,201 | 7/1964 | Reimers et al. | 127/63 |
| 3,544,328 | 12/1970 | Dunning et al. | 99/23 |
| 4,019,688 | 4/1977 | Akunov et al. | 241/39 |
| 4,034,919 | 7/1977 | Akunov et al. | 241/39 |
| 4,918,182 | 4/1990 | Jackson et al. | 536/124 |
| 5,028,444 | 7/1991 | Yamamoto et al. | 426/332 |
| 5,094,862 | 3/1992 | Bunick et al. | 426/96 |
| 5,464,649 | 11/1995 | St. John et al. | 426/660 |

FOREIGN PATENT DOCUMENTS

| | | | |
|---|---|---|---|
| 0 007 037 | 1/1980 | European Pat. Off. | C12F 3/00 |
| 84145 | 1/1988 | Finland | C07H 5/02 |
| 883405 | 1/1990 | Finland | B02C 9/00 |
| WO 87/06854 | 11/1987 | WIPO | B02C 19/06 |

OTHER PUBLICATIONS

Sander, Eugene H., Dr.; "Fluid Energy Mill, Looks Practical for Cake and Chocolate Premix"; *Food Engineering International*; vol. 2, No. 8; pp. 45–47; (1977). Month not available.

"Processing Size Reduction: The Daily Grind"; *Food Engineering International* vol. 16, No. 3; pp. 35, 38; (1991). Month not available.

*Primary Examiner*—Mark L. Bell
*Assistant Examiner*—Patricia L. Hailey
*Attorney, Agent, or Firm*—Scully, Scott, Murphy & Presser

[57] ABSTRACT

The invention relates to a substantially dry fine product comprising fructose, glucose, a sugar alcohol or mixture containing them, prepared by grinding the fructose, glucose, sugar alcohol or mixture containing them substantially autogenously in a counterjet mill and classifying the ground product to a mean particle size of 5–25 μm. The invention also relates to a process for preparing such a fine product and to the use of the product to prepare chocolate or icing, a fondant, hard candy, chewing-gum and a chocolate or truffle filling, and as seed crystals in the production of fructose or said sugar alcohols.

22 Claims, 5 Drawing Sheets

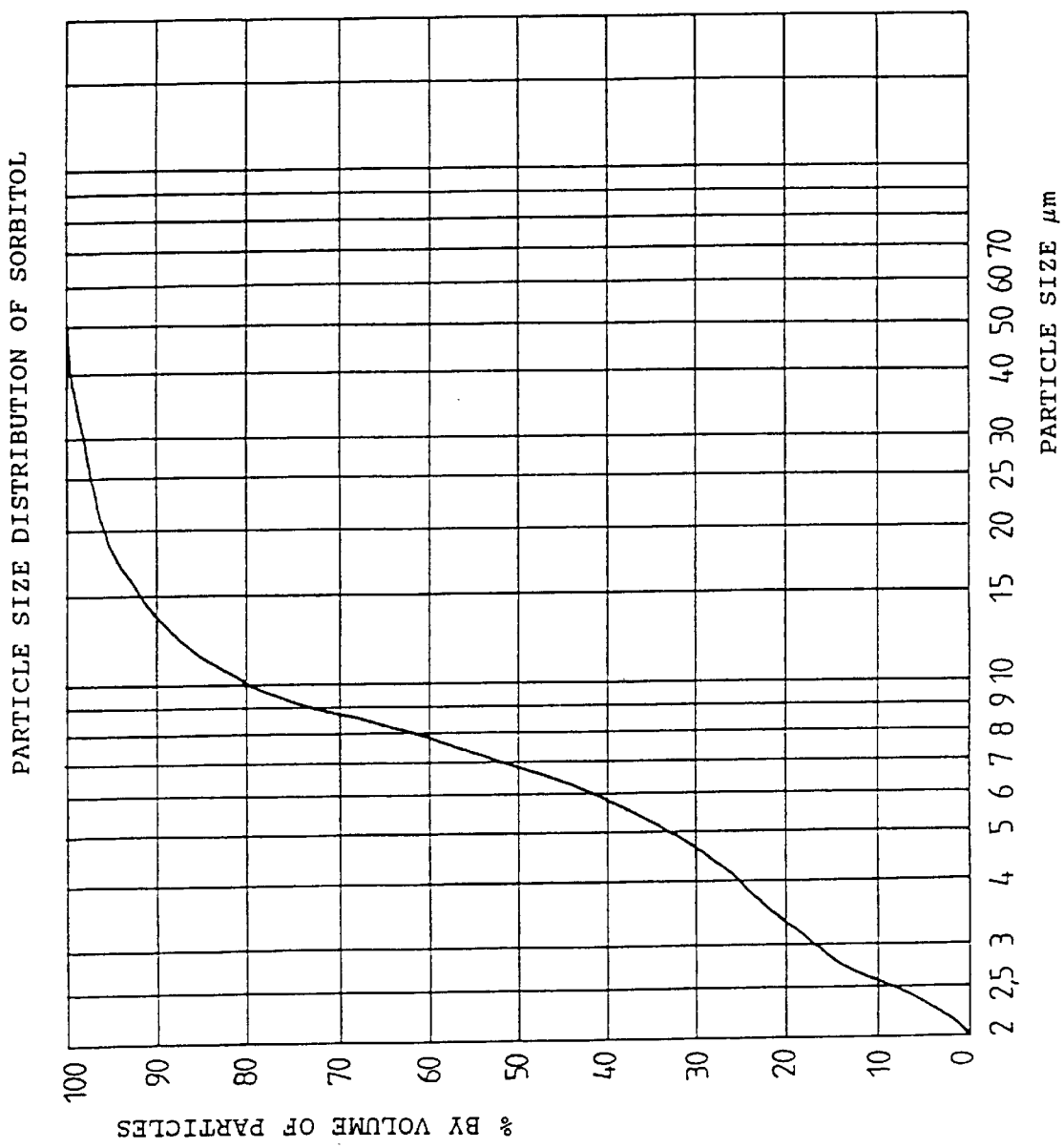

SWEETENING AGENT, PROCESS FOR ITS PRODUCTION, AND ITS USE

BACKGROUND OF THE INVENTION

1. Field of the Invention

The present invention relates to a fine sweetening agent, particularly fructose, glucose, a sugar alcohol or mixtures thereof, obtained by comminuting a corresponding crystalline material to a mean particle size of 5 to 25 μm, a process for its production by counter-jet milling and classification, and its use in fondants, fillings, glazes, chocolate spreads, in the confectionery industry, specifically in chocolates, chewing-gums and dusting gum sticks, and as seed crystals in the industry preparing corresponding crystalline products. The invention also relates to products prepared using this fine sweetening agent.

2. Description of the Prior Art

With many edibles, it is desirable to replace sugar with a special sweetener. Such a sweetener may, for instance, have a lower caloric content than sucrose, be suitable for use by diabetics, and/or be dentally safe. Typical sweeteners of this kind are sugar alcohols, such as xylitol, sorbitol, lactitol, maltitol and isomalt. Fructose is an advantageous sweetener suitable for diabetics. Finely ground glucose may find use in pharmacy, for instance as a carrier.

In several applications, a sweetener must be very fine and also have a very uniform particle size. It is required of many ingested sweet products, for instance chocolate, that they sensorily have a velvety feel. This requires that the sweetener and the other solid ingredients in said products have a very small particle size. Thus for example in prepared chocolate, the proportion of grains having a size exceeding 30 μm must be below 5% in order for the chocolate not to appear coarse to the tongue. This also applies to fondants employed for instance as frostings on bakery products and biscuit products (such as icings for iced doughnuts and gingerbread) and in confectionery fillings.

A sweetener having a grain size in the range 10 μm–1 mm can be used for the production of chocolate when the production process is selected in accordance with the grain size. If the chocolate is produced by a process comprising mixing, rolling and conching of the ingredients, one rolling step, i.e. roll refining, is sufficient when the particle size of the sweetener is less than 200 μm. In order for it to be possible to entirely omit the refining, the particle size of the sweetener must be less than about 20 μm. In another chocolate process that is commonly used, a crumb-like pre-fabricate is prepared from part of the ingredients by heating them in the presence of water and evaporating the water; this pre-fabricate is called the crumb (cf. e.g. Minifie, B. W., *Chocolate, Cocoa and Confectionery*, second edition, AVI Publishing Company, Inc., Westport, Conn., 1982, pp. 108–113). The crumb is mixed with the other ingredients of the chocolate, refined, and conched. Also in this case the refining may be omitted, if the crumb is comminuted to a sufficient fineness prior to the addition of the other ingredients.

Fondants may be either wet fondants or dry fondants. Wet fondants comprise two phases: a solid phase formed by a fine sweetener and a syrup forming a liquid phase. Traditional wet fondants are produced either by cooling crystallization of the product into paste form or by adding the necessary liquid phase to a dry fondant. The production of a fondant and the problems associated with the storage of wet fondant have been discussed for instance in Lees, L. & Jackson, E. B., *Sugar Confectionery and Chocolate Manufacture*, Leonard Hill, 1973, in the section Fondants, Creams and Crystallized Confectionery (pp. 211–215). Storage problems are avoided by using dry fondants wherefrom a wet fondant may be prepared if desired, as stated previously. The conventional dry fondants comprise very fine sugar whereto a small amount of a polysaccharide doctoring/controlling the crystallization, and possibly also fat, has been added.

The production of fondants from sugar alcohols by cooling crystallization is very difficult. On the other hand, fructose and some sugar alcohols, such as xylitol, sorbitol, lactitol monohydrate, maltitol and isomalt, are difficult to grind to particle sizes below 40 μm by the conventional grinding methods (based on kneading, shearing and sifting) on account of the heat sensitivity of said products.

These special sweeteners present problems also in the rolling step of chocolate production, as some of them (fructose, xylitol, sorbitol) bind water on account of their hygroscopicity, and some (for instance lactitol monohydrate and isomalt) may liberate crystal water bound to them, particularly if the refining conditions are violent. In such a case, it is difficult to closely control the content of free water in the chocolate mass, which will present production-technical problems.

For this reason, it would be important that these sweeteners could be ground to a particle size small enough to make them suitable for the production of dry fondants, and that their use would obviate the refining step of the chocolate process.

A solid dry material can be ground to a very fine particle size with a counterjet mill wherein the particles to be comminuted that are fluidized in a carrier gas, typically air, are conveyed so as to collide with one another at a high speed. Advantageously a classifier wherein the ground material is classified into fractions of varying particle sizes is provided in connection with the mill. Such apparatus and processes have been disclosed in several patent publications, for instance in Finnish Patents 62 235, 72 896, 72 897, 74 222, 77 580, 77 168 and 80 617, and they have been implemented mainly to industrial minerals and pigments that are difficult to grind. Finnish Patent Application 883405 discloses the comminution of cereal flour with a counterjet mill and classifier. Finnish Patent 85 145 discloses the comminution of a crystalline sweetener, sucralose, with a jet mill to a maximum mean particle size of 10 μm, the greatest particle size being not more than twice the mean particle size. The significance of grinding has been dealt with in Eynck, V., "Dry Mixing System in Manufacture of Confectioner Coating", *The Manufacturing Confectioner*, October 1986, pp. 57–59.

When a counterjet mill and classifier were used for grinding fructose, glucose and sugar alcohols, very difficult problems were presented by clodding and vaulting of the material to be ground in the first tests, and the method was not suitable for industrial production. In further tests it was found that by suitable regulation of the temperature and pressure of the air employed as a carrier gas in the milling, clodding of the product could be avoided.

SUMMARY OF THE INVENTION

The object of the present invention is to provide a fine product comprising fructose, glucose, a sugar alcohol, such as xylitol, sorbitol, lactitol, maltitol or isomalt, or a mixture containing them, having a particle size and a particle size distribution suitable for use in the production of chocolate, chocolate flavoured coating and fondant without additional comminution, and being simple and cost-effective to produce.

These objects are achieved with the substantially dry fine product of the invention comprising fructose, glucose, a sugar alcohol or a mixture containing them, being characterized in that it is prepared by grinding the fructose, glucose, sugar alcohol or mixture containing them substantially autogenously with a counterjet mill and classifying the ground product to a mean particle size of 5 to 25 μm.

The invention also relates to a process for producing the above fine product, the process being characterized in that crystalline fructose, glucose, a sugar alcohol or a substantially dry mixture containing them is ground substantially autogenously with a counterjet mill at a temperature of 20–80° C. employing air having a dew point in the range −21−+10° C. as a carrier gas, and the ground product is classified to give a product having a mean particle size of 5 to 25 μm.

BRIEF DESCRIPTION OF THE DRAWINGS

FIG. 5 is a graph representing the particle size distribution of sorbitol in a dry fine product produced in accordance with the present invention.

DETAILED DESCRIPTION OF THE ART

Figure 1:
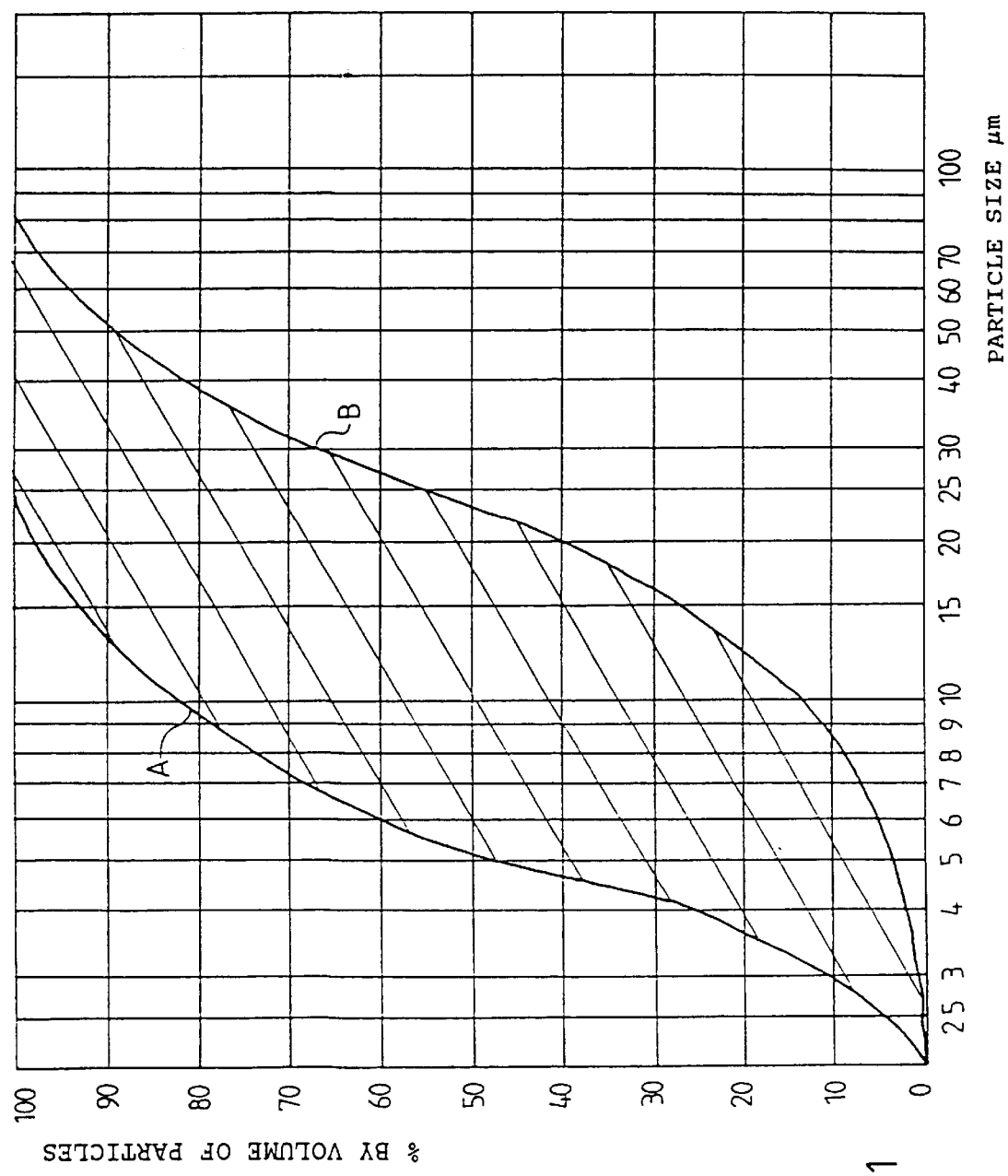
FIG. 1 is a graph illustrating the mean particle size distribution of the dry fine product produced in accordance with the present invention.

The particle size distribution of the fine product produced in accordance with the invention as determined by the PMT - PAMAS method is advantageously in the range defined by curves A and B in FIG. 1. When the mean particle size is 5 μm, preferably a maximum of 50% of the particles have a size below 5 μm and a maximum of 20% above 10 μm. When the mean particle size is 25 μm, preferably a maximum of 15% of the particles have a particle size below 10 μm and a maximum of 20% above 40 μm.

The pressure of the carrier gas employed in the process of the invention is selected to be suited to the construction of the respective mill and the material to be ground. It may for instance vary in the range 1.5 to 5 bar. The ground product is preferably divided in the classifier into two fractions, the coarser of which may be recycled to the mill or used as such for a suitable purpose. The product according to the invention, having a mean particle size of 5 to 25 μm, is recovered as the finer fraction.

Figure 2:
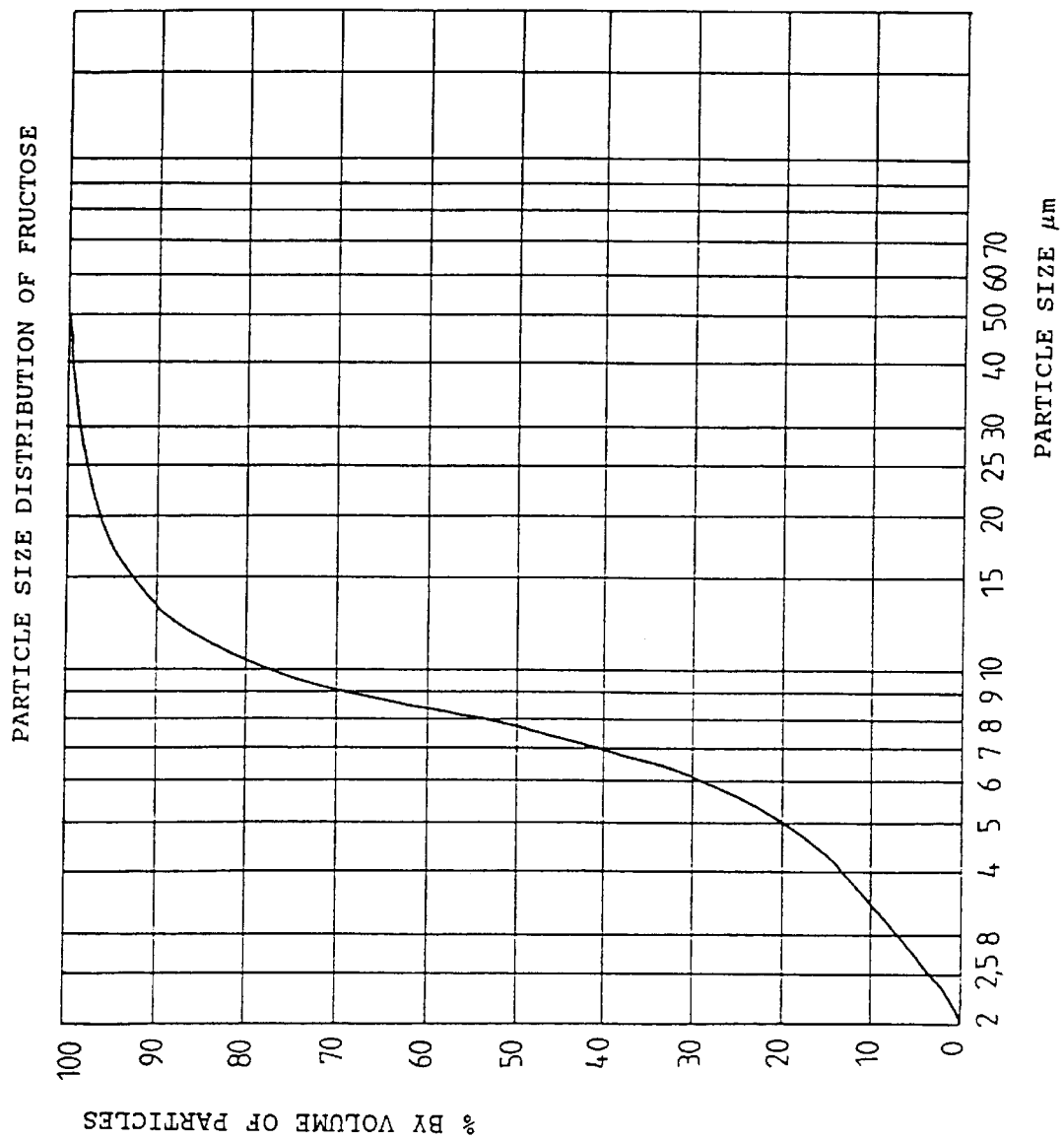
FIG. 2 is a graph representing the particle size distribution of fructose in a dry fine product produced in accordance with the present invention.

When the crystalline fructose, xylitol, lactitol monohydrate and sorbitol were ground and classified by the process of the invention, products with a particle size distribution as shown in FIGS. 2 (fructose), 3 (xylitol), 4 (lactitol monohydrate) and 5 (sorbitol) were obtained.

A fine product according to the invention can be prepared from lactitol, employing crystalline lactitol anhydride, monohydrate or dihydrate as a starting material. The lactitol used as the starting material will then remain substantially unchanged during the grinding with regard to water content and hygroscopicity.

The fine product according to the invention is suitable for the production of chocolate and coatings without roll refining. Further, it is well suited for use in icings for bakery products, particularly biscuit products.

The fine fructose and sugar alcohols of the invention are suitable for the production of fondants as such or in admixture with sugar-free polyol syrups. Suitable syrups include maltitol syrups, polydextrose and sorbitol syrup.

Other fields of use for the fine product of the invention include use in the production of chewing-gums, fillings, e.g. fillings for chocolate and truffles, and hard candy.

With the process of the invention, a dry fondant can also be prepared by simultaneously grinding the fructose or sugar alcohol and the dried polyol syrup. A wet fondant can be prepared from the dry fondant of the invention simply by mixing the dry fondant in a suitable liquid portion.

The process of the invention has also been found to be suitable for grinding a crumb employed in chocolate production, the fine premix obtained being useful for chocolate production without roll refining.

The following advantages, for example, are achieved with the process of the invention:

the fructose, glucose and sugar alcohols can be ground to a fine particle size (below 40 μm) without the physicochemical properties of the product being substantially changed, the particle size can be easily controlled, so that the product gives an agreeably smooth sensation, the grinding is substantially autogenous, that is, the material to be comminuted will only come into contact with foreign materials to a very small degree and thus contamination will remain low, the energy consumption is small, the air employed as a carrier gas can be regulated to be specifically suited to the product, the product obtained is pure in taste and colour.

The invention will be illustrated in more detail by means of the following examples, which are not intended to restrict the scope of the invention. The particle size distribution stated in the examples was determined by the PMT - PAMAS method.

EXAMPLE 1

Grinding of fructose

Crystalline fructose (Fructofin C™, manufacturer Xyrofin Oy) having a mean particle size range of 0.35 to 0.55 mm was ground and classified with a counterjet mill FP3P and rotor classifier FPC15R, manufactured by Oy Finnpulva Ab. The crystalline fructose employed as the raw material was fluidized in air employed as a carrier gas in a pressurized chamber and the fluidized mixture obtained was accelerated in mill jets wherefrom it was conveyed to a milling chamber. The temperature in the fluidizing and acceleration steps was 42° C., the feed pressure 4.6 bar (460 kPa).

The particle size distribution of the fructose powder thus obtained is shown in FIG. 2.

EXAMPLE 2

Grinding of xylitol

Crystalline xylitol (Xylitol C™, manufacturer Xyrofin Oy) having a mean particle size range of 0.40 to 0.60 mm, was ground and classified in accordance with Example 1, except that the temperature was 50° C. and the feed pressure 4.4 bar (440 kPa).

Figure 3:
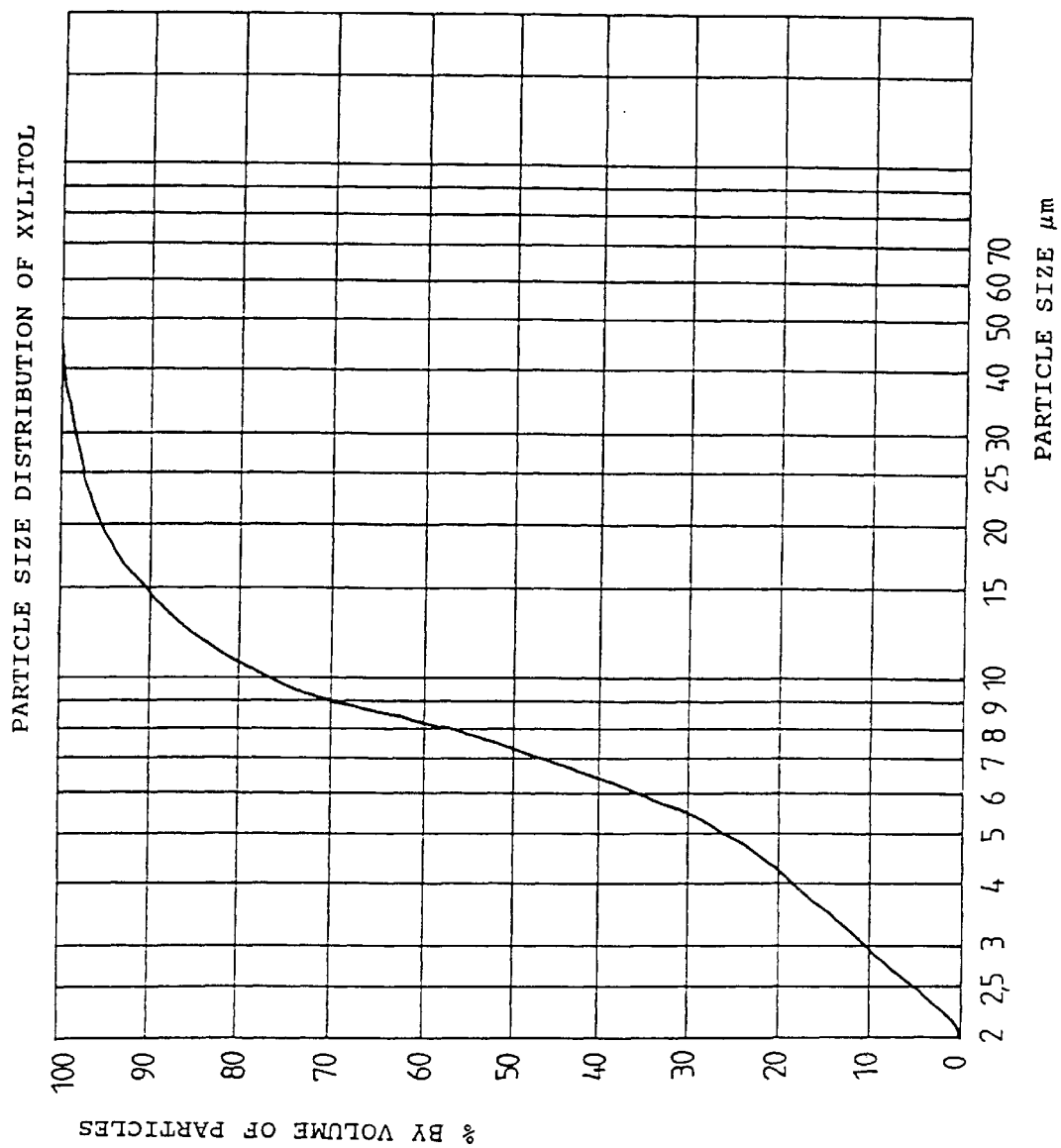
FIG. 3 is a graph representing the particle size distribution of xylitol in a dry fine product produced in accordance with the present invention.

The particle size distribution of the xylitol powder obtained is shown in FIG. 3.

EXAMPLE 3

Grinding of lactitol monohydrate

Figure 4:
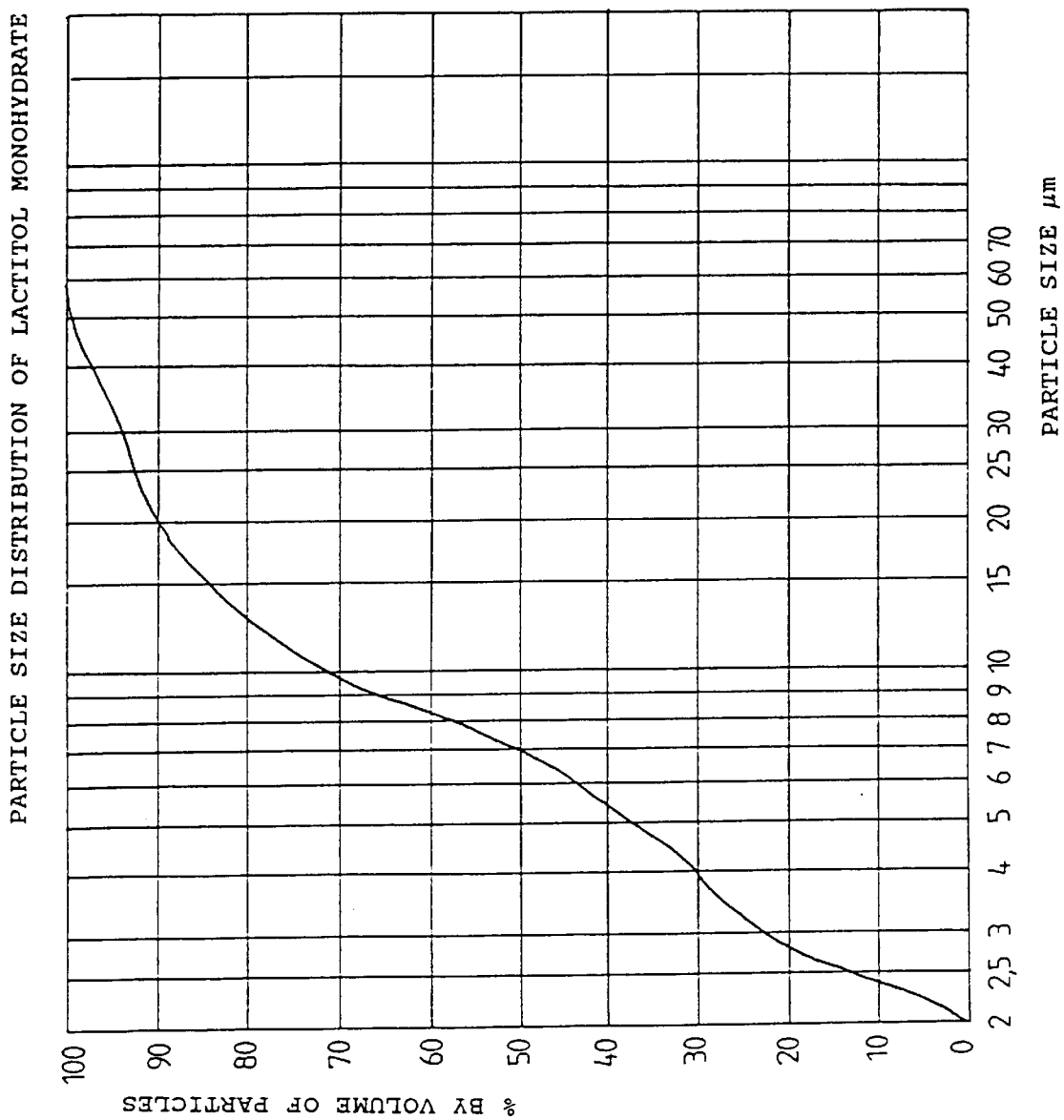
FIG. 4 is a graph representing the particle size distribution of lactitol monohydrate in a dry fine product produced in accordance with the present invention.

Crystalline lactitol monohydrate was ground in accordance with Example 1, except that the temperature was 30° C. and the feed pressure 2 bar (200 kPa). The particle size distribution of the product obtained is shown in FIG. 4.

EXAMPLE 4

Grinding of sorbitol

Crystalline sorbitol was ground correspondingly. The particle size distribution of the product obtained is shown in FIG. 5.

EXAMPLE 5

Xylitol fondant

A wet fondant was prepared from a xylitol powder obtained in accordance with Example 2 employing the following raw materials:

|  |  |
|---|---|
| Xylitol | 300 g |
| Finmalt L ™ 75%* | 135 g |
| Water | 6 g |

*Commercial maltitol syrup, dry solids content 75%, manufacturer Xyrofin Oy.

The xylitol powder was added to a mixture of water and Finmalt L™ at a temperature of 50° C. of the liquid portion and stirred in a Hobart blade mixer for 3 minutes.

EXAMPLE 6

Fructose fondant

A wet fondant was prepared from a fructose powder obtained in accordance with Example 1 employing the following raw materials:

|  |  |
|---|---|
| Fructose | 300 g |
| Finmalt L ™ 75% | 135 g |
| Water | 6 g |

A fondant was prepared from the ingredients similarly as in Example 5.

EXAMPLE 7

Xylitol-sorbitol fondant

A wet fondant was prepared from xylitol and sorbitol powders obtained in accordance with Examples 2 and 4 employing the following raw materials:

|  |  |
|---|---|
| Xylitol | 300 g |
| Sorbitol | 100 g |
| Water | 40 g |

The xylitol and sorbitol powders were added to the water at a temperature of 50° C., and thereafter the procedure of Examples 5 and 6 was followed.

EXAMPLE 8

Xylitol-maltitol fondant

A wet fondant was prepared from a xylitol powder obtained in accordance with Example 2 employing the following raw materials:

|  |  |
|---|---|
| Xylitol | 300 g |
| Water | 40 g |
| Maltitol powder* | 100 g |

*For example the commercial product Maltisorb ™, manufacturer Roquette Frères

The maltitol powder was dissolved in water at 70° C., and the solution obtained was cooled to 40–50° C., followed by the addition of the xylitol powder. Thereafter the procedure of Examples 5 to 7 was followed.

EXAMPLE 9

Lactitol fondant

A wet fondant was prepared from a lactitol powder obtained in accordance with Example 3 employing the following raw materials:

|  |  |
|---|---|
| Lactitol | 300 g |
| Finmalt L ™ 75% | 140 g |
| Water | 10 g |

Finmalt L™ and water were stirred together, and the lactitol powder was added to the liquid portion at a temperature of 60° C. of said portion, whereafter the procedure of Example 5 was followed.

All masses of Examples 5 to 9 mixed into consistent fondants without problem. They appeared smooth to the mouth, comparable to a high-quality sugar fondant.

EXAMPLE 10

Xylitol dark chocolate

Dark chocolate was prepared from a xylitol powder obtained in accordance with Example 2 employing the following raw materials:

|  | % |
|---|---|
| Xylitol | 46.5 |
| Cocoa liquor | 41.0 |
| Cocoa butter | 12.0 |
| Lecithin | 0.48 |
| Vanillin | 0.02 |

Dry solids content 99.6%, fat content 34.5%.

Method: No refining; conching at 50° C. for 6 hours.

EXAMPLE 11

Fructose dark chocolate

Dark chocolate was prepared from a fructose powder obtained in accordance with Example 1 employing the following raw materials:

|  | % |
|---|---|
| Fructose | 46.5 |
| Cocoa liquor | 41.0 |
| Cocoa butter | 12.0 |
| Lecithin | 0.48 |
| Vanillin | 0.02 |

Dry solids content 99.6%, fat content 34.5%.

Method: No refining; conching at 50° C. for 17 hours.

Similarly as in Examples 10 and 11, dark lactitol chocolate can be prepared employing lactitol ground in accordance with the invention in either anhydride, monohydrate or dihydrate form.

EXAMPLE 12

Lactitol milk chocolate

Lactitol chocolate was prepared from the following raw materials:

|  | g |
| --- | --- |
| Cocoa butter | 345 |
| Cocoa liquor | 195 |
| Skimmed milk powder | 150 |
| Lactitol monohydrate | 790 |
| Milk fat | 50 |
| Acesulfame K | 1.4 |
| Vanillin | 0.3 |
| Lecithin | 6 |

Method: Grinding of milk powder and lactitol monohydrate together in accordance with the invention to a particle size of about 10 μm. No refining; conching at 50° C. for 20 hours.

Fructose milk chocolate and xylitol milk chocolate can be produced correspondingly.

EXAMPLE 13

Truffle

Truffle is prepared employing the following raw materials (the fondant and chocolate components have been prepared using the fine product according to the invention):

| Dry fondant | 32.0% |
| --- | --- |
| Water | 4.0% |
| Dark or milk chocolate | 54.5% |
| Butter | 9.0% |
| Lecithin | 0.5% |

The dry fondant and water are stirred together for example in a Hobart mixer, and the melted chocolate and butter at 35–40° C. and lecithin are added into the mixer.

The mixture is whipped to a suitable fluffy consistency, and spread for example on baking paper coated with cocoa powder, or extruded into moulds with a pastry bag. The mixture is allowed to crystallize for 1 to 2 hours.

What is claimed is:

1. A substantially dry fine product consisting essentially of fructose, glucose, a sugar alcohol or a mixture thereof, wherein said product is prepared by grinding the fructose, glucose, sugar alcohol or mixture thereof substantially autogeneously with a counterjet mill and classifying the ground product to a mean particle size of 5 to 25 μm.

2. The product according to claims 1, wherein said product has a particle size distribution in the range defined by curves A and B of FIG. 1.

3. The product according to claim 1, wherein said product has a mean particle size of 5 μm with a maximum of 50% of its particles having a size below 5 μm and a maximum of 20% of its particles having a size above 10 mm.

4. The product according to claim 1, wherein said product has a mean particle size of 25 μm with a maximum of 15% of its particles having a particle size below 10 μm and a maximum of 20% of its particles having a particle size above 40 μm.

5. The product according to claim 1, wherein said sugar alcohol is selected from the group consisting of xylitol, lactitol, sorbitol, maltitol, isomalt and mixtures thereof.

6. The product according to claim 1, wherein said product is comprised of fructose.

7. The product according to claim 6, wherein said product has a particle size distribution of said fructose substantially in accordance with that shown in FIG. 2.

8. The product according to claim 1, wherein said product is comprised of xylitol.

9. The product according to claim 8, wherein said product has a particle size distribution of said xylitol substantially in accordance with that shown in FIG. 3.

10. The product according to claim 1, wherein said product is comprised of lactitol.

11. The product according to claim 10, wherein said lactitol is crystalline lactitol monohydrate or crystalline lactitol anhydride.

12. The product according to claim 11, wherein said lactitol is crystalline lactitol monohydrate and said product has a particle size distribution of said crystalline lactitol monohydrate substantially in accordance with that shown in FIG. 4.

13. The product according to claim 11, wherein said product is comprised of sorbitol.

14. The product according to claim 13, wherein said product has a particle size distribution of said sorbitol substantially in accordance with that shown in FIG. 5.

15. A process for preparing a substantially dry fine product prepared from fructose, glucose, a sugar alcohol or a mixture thereof, consisting essentially of the following steps:

(a) grinding the fructose, glucose, sugar alcohol or mixture thereof substantially autogeneously with a counterjet mill; and (b) classifying the ground product of step (a) to produce a classified product having a mean particle size of 5 to 25 μm.

16. The process according to claim 15, wherein said counterjet mill is operated at a temperature of 20–80° C. and employs air as a carrier gas.

17. The process according to claim 16, wherein said carrier gas has a pressure of 1.5 to 5 bar.

18. The process according to claim 16, wherein said air has a dew point in the range of −21 to +10° C.

19. The process according to claim 15, wherein said classified product of step (b) has a particle size distribution in the range defined by curves A and B of FIG. 1.

20. A process for preparing a dry fondant consisting essentially of the following steps:

(a) grinding fructose, glucose, a sugar alcohol or a mixture thereof with a dried polyol syrup substantially autogeneously with a counterjet mill at a temperature of 20–80° C. employing air having a dew point in the range of −21 to +10° as a carrier gas; and (b) classifying the ground product of step (a) to produce a classified product having a mean particle size of 5 to 25 μm.

21. The process according to claim 20, wherein said dried polyol syrup is selected from the group consisting of maltitol syrup, polydextrose and sorbitol syrup.

22. The process according to claim 21, wherein said carrier gas has a pressure of 1.5 to 5 bar.

* * * * *